United States Patent
Townsend

[15] 3,658,380
[45] Apr. 25, 1972

[54] SPRING SEAT FOR CYCLE SADDLES

[72] Inventor: Almon F. Townsend, Worcester, Mass.

[73] Assignee: Persons-Majestic Mfg. Co., Worcester, Mass.

[22] Filed: June 15, 1970

[21] Appl. No.: 46,487

Related U.S. Application Data

[63] Continuation-in-part of Ser. No. 778,928, Nov. 26, 1968.

[52] U.S. Cl. .........................297/211, 297/DIG. 9, 297/195
[51] Int. Cl. ......................................................B62j 1/02
[58] Field of Search..................297/212, 211, 209, 210, 208, 297/195, DIG. 9

[56] References Cited
UNITED STATES PATENTS

| | | | |
|---|---|---|---|
| 2,613,723 | 10/1952 | Bryant | 297/DIG. 9 |
| 2,286,138 | 6/1942 | Kalter | 297/211 X |
| 2,331,213 | 10/1943 | Mesinger | 297/DIG. 9 |
| 2,467,676 | 4/1949 | Labine | 297/211 |
| 2,937,690 | 5/1960 | Hedstrom | 297/212 |

FOREIGN PATENTS OR APPLICATIONS

724,555    1932    France..................................297/211

*Primary Examiner*—James T. McCall
*Attorney*—Charles R. Fay

[57] ABSTRACT

Elongated saddle for a cycle having rear wheel braces, springs for the braces supporting the rear portion of the saddle, a truss secured to the braces, and a spring on the truss at its forward end supporting the front portion of the saddle.

4 Claims, 6 Drawing Figures

PATENTED APR 25 1972 3,658,380
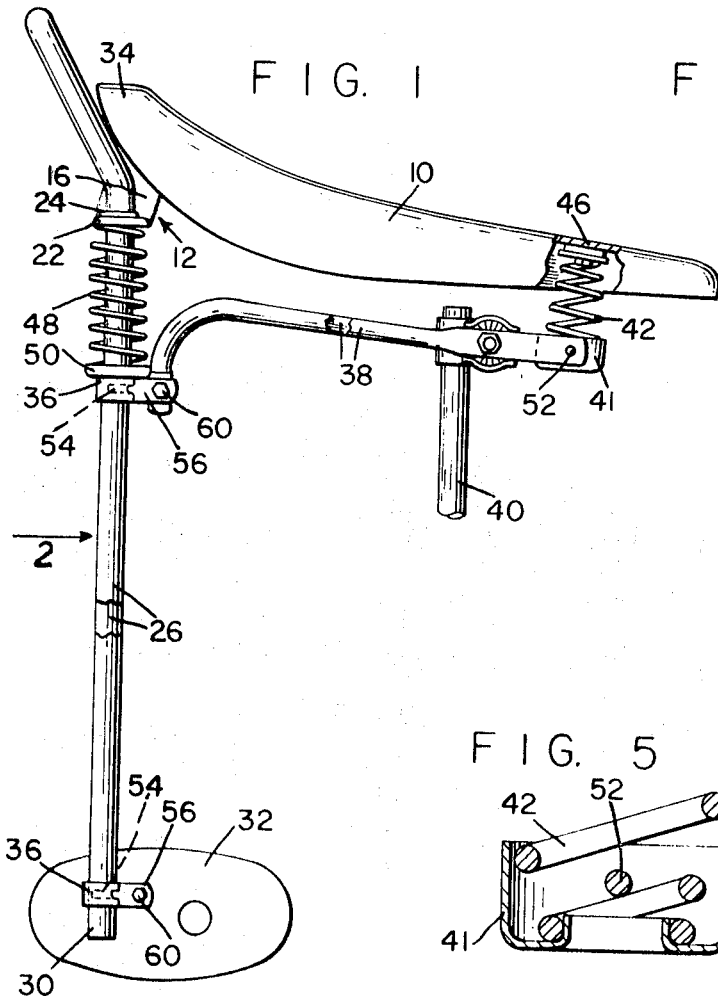
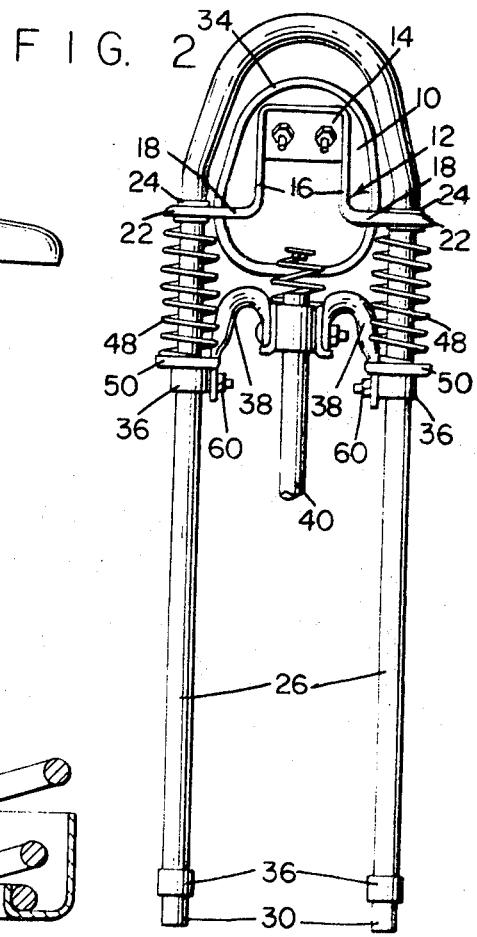
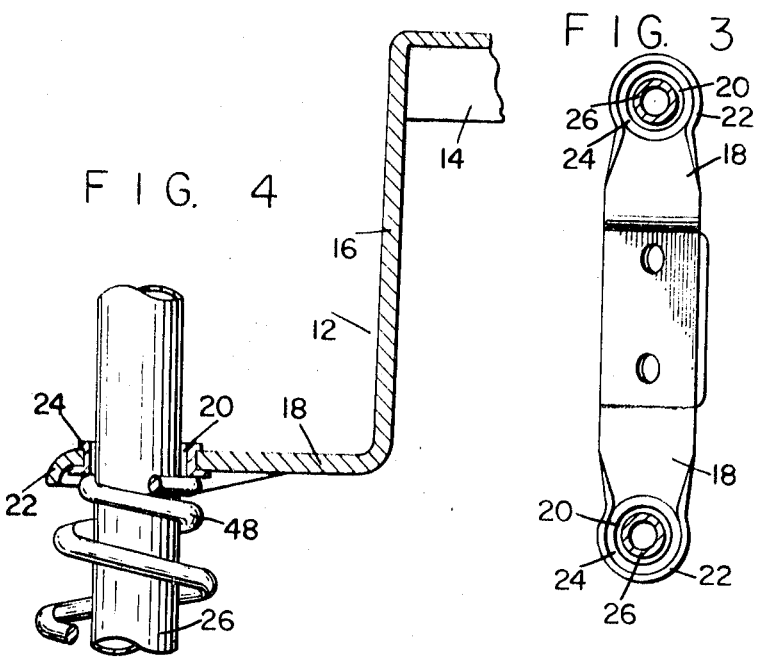
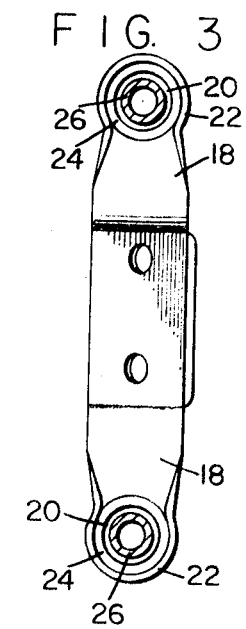
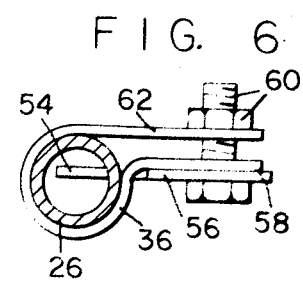
INVENTOR
ALMON F. TOWNSEND
BY Chas. R. Fay,
ATTORNEY

SPRING SEAT FOR CYCLE SADDLES

This application is a continuation-in-part of my prior application Ser. No. 778,928 filed Nov. 26, 1968.

BACKGROUND OF THE INVENTION

Elongated saddles have long been used on cycles and some have been resiliently mounted on braces supported from the rear wheel hub or on end plates, but the conventional pivot mount for the front portion or pommel has been used. Thus as the saddle pivots under conditions of use, the arc of the rear of the saddle in its up and down motion requires that the braces oscillate on the hub or end plates tending to loosen the connection therewith. It is the object of this invention to provide a novel resilient support and truss combination avoiding this deficiency of the prior art.

SUMMARY OF THE INVENTION

This invention provides springs coiled about the braces, and means to mount the rear part of the elongated saddle on the springs at their upper ends, thereby movably and resiliently supporting the saddle at the rear. A truss is fixed to the braces and extends forwardly receiving the saddle post of the cycle and mounting a pivot support for another sprint to resiliently support the saddle at the front end, i.e., at the pommel. Thus adequate support for the saddle is provided and at the same time it is resilient, but the truss ensures that the braces cannot oscillate, any tendency of such motion being taken up by the spring and pivot mounting at the front end or pommel of the saddle.

BRIEF DESCRIPTION OF THE DRAWINGS

FIG. 1 is a view in side elevation of a saddle mounting according to the invention;

FIG. 2 is a rear elevational view looking in the direction of arrow 2 in FIG. 1;

FIG. 3 is an enlarged plan view of the saddle bracket with the brace in section;

FIG. 4 is a sectional detail view of a portion of the saddle bracket;

FIG. 5 is a sectional view of the pivot cup, and

FIG. 6 illustrates a connection for the truss and brace.

PREFERRED EMBODIMENT OF THE INVENTION

An elongated "banana" seat or saddle 10 has fixed thereto a bracket 12 which comprises a plate 14 secured to the saddle at its bottom surface closely adjacent the rear edge thereof. This plate has a pair of bent down side arms 16, 16 terminating in outwardly extending feet 18, 18. The plate 14 is fixed in position at the under surface of the saddle.

Each foot 18, 18 has an opening 20, 20 in its end portion, and surrounding the opening the edges of the feet 18 are bent down forming inverted cups as at 22, 22. If desired, a sleeve 24 of protective or bearing material is located in each opening through which the braces 26 extend in a loose fashion, the bracket 12 being relatively slidable on the braces.

The braces are usually of one piece of tubing in inverted "U" shape, the lower free ends 30, 30 being fastened at the hub of the rear wheel, not shown, or to the end plates 32 for the hub. The saddle does not interfere with the braces but the rear end of the saddle as at 34 is thus slidingly connected thereto and can move up and down thereon.

Some form of stop such as a clip or the like 36 is fixed to each brace and these serve as connections for the truss members 38, 38 which extend forward, to the right in FIG. 1, in a converging manner. These truss members mount a fixture more or less conventional for securement of the saddle to the usual saddle post 40, and also support between them a pivoted cup 41 receiving the lower end of a saddle nose spring 42 fastened at the under side of the saddle at its front end portion as by a plug, rivet, etc., to the plate 46 forming the base of the saddle.

The forward spring 42 is preferably smaller or stiffer than the two rear springs 48, 48, the upper ends of the latter being retained in cups 22 and the lower ends in cups 50, 50. Cups 50 are stopped by clips 36.

Therefore, the saddle has an up and down motion which is resilient, i.e., spring resisted, and comfortable, and this effect would still exist even in the absence of spring 42. The spring 42, however, enhances the overall resilient action, and more important, allows the saddle to move vertically at the rear portion on brace 26, and since the truss 38 firmly holds the brace, any fore-and-aft motion is taken up by spring 42 which is not restrained against such motion.

The springs are essentially at the fore-and-aft ends of the elongated saddle which is adequately supported through the use of this construction, without, however, the necessity for more expensive spring structures, and avoiding the inadequaces of the prior art pivot action explained above.

FIG. 5 shows the pivot pin 52 that passes through both truss parts 38, 38, holding the lower end of spring 42 and allowing a pivot action under influence of tendency of spring 42 to move fore-and-aft, or to oscillate under conditions of vertical oscillation of the saddle at its rear end.

FIG. 6 illustrates the securement of clips 36 to the tubing making up the brace 26. A forward nose 54 on a plate 56 passes through a hole in leg 58 of clip 36 and also into a corresponding hole in the brace. Fastener 60 then secures the plate 56 to leg 58 and also leg 62 with the plate 56 mechanically interlocked with the clip.

I claim:

1. In a cycle, a support for a saddle for the cycle comprising a brace, means mounting the brace in a substantially upright manner;

a saddle, a bracket on the saddle having a generally rectilinear sliding engagement with the brace, said bracket and brace being located at the rear portion of the saddle, a spring to support the saddle adjacent the forward end thereof, said spring being unconstrained against a limited fore and aft motion, resilient means on the brace yieldingly resisting downward motion of the saddle at its rear portion, and a truss secured to the brace and to the spring supporting the saddle adjacent the forward end thereof, preventing any tendency of the saddle to oscillate on an arc at its rear end portion and aiding in the rectilinear sliding motion thereof.

2. The cycle of claim 1 including a cup on the truss receiving the lower end of the spring.

3. The cycle of claim 1 including pivoted cup on the truss receiving the lower end of the spring.

4. The cycle of claim 1 including a cup on the truss, means pivoting the cup to the truss, the lower end of the spring being held in the cup.

* * * * *